United States Patent [19]

Freeman

[11] 4,157,585
[45] Jun. 5, 1979

[54] LIGHT FIXTURE

[76] Inventor: Jerry H. Freeman, 1100 W. Pendleton Pl., Mt. Prospect, Ill. 60056

[21] Appl. No.: 787,340

[22] Filed: Apr. 14, 1977

[51] Int. Cl.² .............................. F21S 1/02; B60Q 1/00
[52] U.S. Cl. ..................................... 362/248; 362/74; 362/368
[58] Field of Search .............. 362/226, 227, 249, 362, 362/365, 368, 74, 147, 382

[56] References Cited

U.S. PATENT DOCUMENTS

| | | | |
|---|---|---|---|
| 1,631,678 | 6/1927 | Godley | 362/249 |
| 1,981,302 | 11/1934 | Bobroff | 362/227 X |
| 2,016,557 | 10/1935 | Rach et al. | 362/227 X |
| 3,093,320 | 6/1963 | Knapp | 362/227 |
| 3,118,616 | 1/1964 | Magazanik | 362/227 |
| 3,671,739 | 6/1972 | McCain | 362/74 X |

*Primary Examiner*—William M. Shoop
*Assistant Examiner*—Peter S. Wong

[57] ABSTRACT

The light fixture of the present invention includes an open frame, a mounting plate covering one side of the frame, and a lens covering the opposite side of the frame. The mounting plate is a metal stamping which has an integrally formed bracket that is adapted to carry and support a pair of light bulbs, a first light bulb for normal illumination, and a second light bulb for reduced illumination during the night. The light bulbs are disposed in a pair of side-by-side openings in the bracket, and arcuate flange segments extend around a portion of each opening to supportively engage the cylindrical base at one end of a light bulb. A pair of terminal clips are secured to the frame beneath the bracket, with each terminal clip including a contact portion disposed in registry with one of the openings in the bracket, so that each terminal clip contact portion can engage a contact point at the end of a light bulb.

6 Claims, 4 Drawing Figures

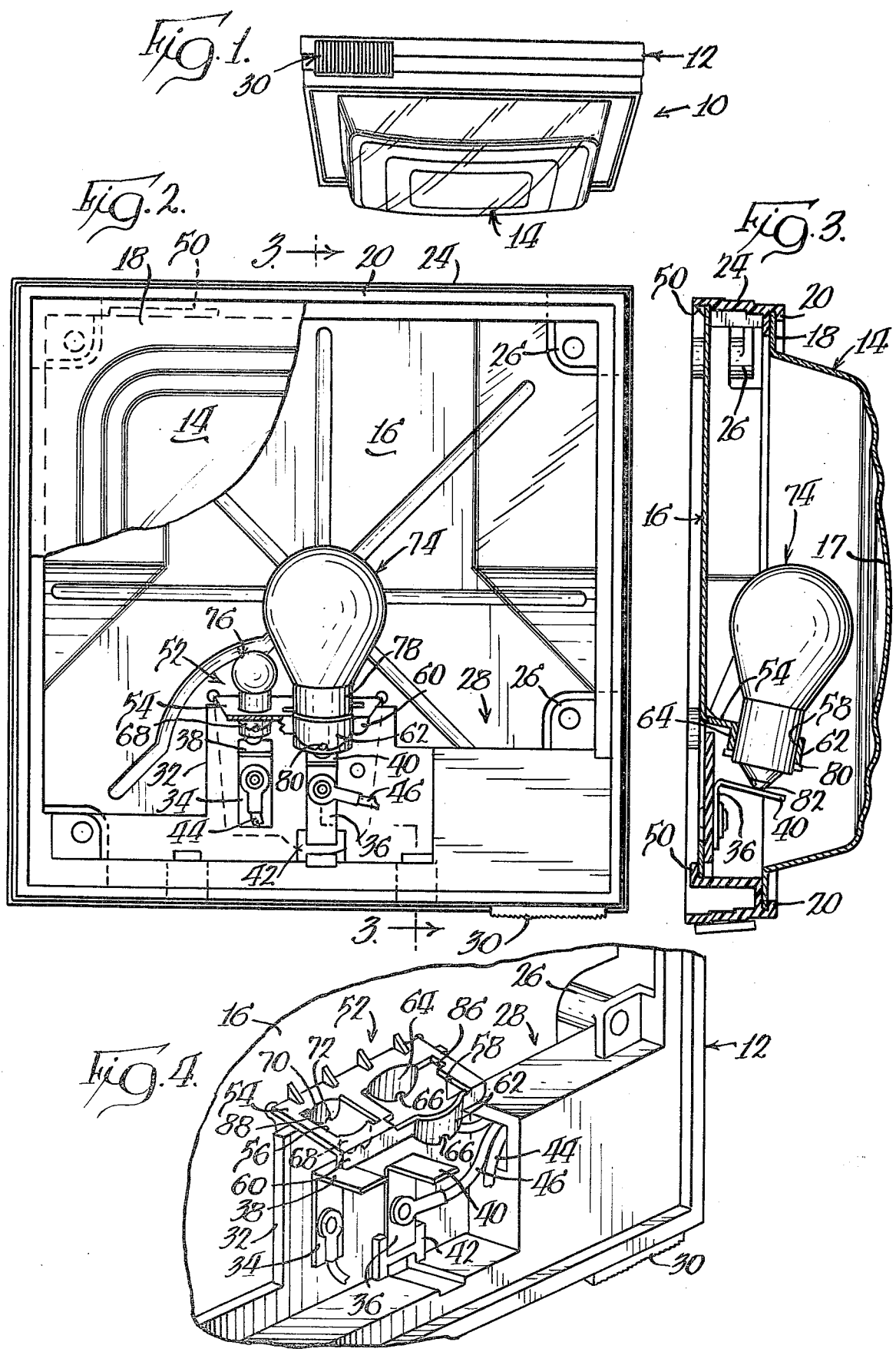

LIGHT FIXTURE

BACKGROUND OF THE INVENTION

In the past many different forms of light fixtures have been proposed, made and sold for providing two levels of illumination, a first level of illumination being utilized when it was desired to have a high light level, and a second level of illumination being utilized when a lower level of light was desired, such as at night. The light fixtures that have been proposed heretofore to provide this function have had several problems and deficiencies. One of the more annoying problems has been that such fixtures were physically constructed in a manner such that it was very difficult to remove and replace one or both of the light bulbs, when desired. Another problem with the prior devices is that the mounting structures for the light bulbs were constructed in a manner such that the resulting light fixtures were unduly complicated and expensive to fabricate.

SUMMARY OF THE INVENTION

The light fixture of the present invention solves the problems of the prior art by providing a simply constructed, inexpensive light bulb mounting structure which enables the light bulbs to be readily removed and replaced when necessary.

Specifically, in the light fixture of the present invention, a cover, or mounting plate, is provided which has a bracket formed integrally therewith, which bracket has a pair of side-by-side openings therein. Arcuate flange segments are provided at diametrically opposed sides of each bracket opening, and recesses are provided in the flange segments for receiving mounting pins which project outwardly from the cylindrical base of a light bulb seated within the openings of the bracket.

In the light fixture of the present invention, the aforementioned mounting plate is seated within an open frame, and a pair of terminal clips are secured to the frame, with each clip including a contact portion disposed below and in registry with the openings in the mounting plate bracket. The contact portions are located so as to make electrically conductive engagement with a contact disposed at the lower end of the light bulb seated within the bracket.

A lens is secured to the frame at a side thereof opposite to the mounting plate to complete the light fixture of the present invention.

BRIEF DESCRIPTION OF THE DRAWINGS

FIG. 1 is a perspective view illustrating the light fixture of the present invention;

FIG. 2 is an enlarged top plan view of the light fixture of the present invention, with a majority of the lens being broken away to show details of internal construction;

FIG. 3 is a cross-sectional view taken generally along line 3—3 of FIG. 2; and

FIG. 4 is an enlarged perspective view illustrating details of the mounting bracket construction.

DESCRIPTION OF THE PREFERRED EMBODIMENT

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

The light fixture is indicated in its entirety at 10, and in its illustrated form, the light fixture is a dome light adapted to be mounted to the ceiling of a recreational vehicle, or the like. As is evident from the drawings, the illustrated light fixture is generally square in overall configuration and includes an open rectangular frame 12 having a lens 14 seated therewithin. A mounting plate 16 is secured to frame 12 at the side thereof opposite from lens 14.

As can be best seen in FIG. 3, lens 14 has an outwardly dished central portion 17 and a peripherial flat flange 18. Lens 14 is preferably formed of a translucent plastic material, such as polyproplene, and is sufficiently flexible that the lens can be manually compressed and flange 18 seated under lip 20 on frame 12.

Frame 12 is formed of four generally identical, integrally interconnected walls 24, and apertured posts 26 are formed integrally with the frame 12 and are adapted to receive fasteners for securing the light fixture to a ceiling structural member. A terminal block 28 is formed integrally with frame 12, and housed therewithin is a switch for establishing an electric circuit to each of the two illumination means to be hereafter described. The switch may take the form of a conventional slide switch having and exposed mechanical actuator 30.

Frame 12 includes an upright flange or wall 32 adjacent to terminal block 28, and a pair of generally L-shaped terminal clips 34 and 36 are secured thereto, as by riveting or the like. Terminal clips 34 and 36 are mounted in side-by-side, spaced relationship, and contact portions 38 and 40 of clips 34 and 36, respectively, extend outwardly from wall 32. As will be evident from the following description, terminal clip 34 is associated with the smaller light bulb for night illumination, whereas the terminal clip 36 is associated with a larger light bulb for general purpose illumination. The lower end of terminal clip 36 is seated within a generally H-shaped support formed integrally with frame 12, and while terminal clip 34 is shown being secured to the wall 32 solely by a rivet, it should be understood that a support similar to 42 may also be provided for terminal clip 34.

Wires 44 and 46 extend from the switching mechanism within terminal block 38 to terminal clips 34 and 36, respectively, and are preferably connected thereto by the same rivet which connects the terminal clips to wall 32. Terminal clips 34 and 36 are both formed from a flexible, spring-like electrically conductive metallic material.

Mounting plate 16 is a generally square member that is seated within walls 24 of frame 12, and is captured by locking lugs 50 formed integrally with frame 12. Mounting plate 16 is a sheet metal member, and an integral bracket means 52 is stamped therefrom. Bracket means 52 includes a generally planar bracket member 54 extending outwardly from the plane of plate 16, and disposed immediately above wall 32 of frame 12. Bracket 54 extends downwardly at a slight angle, as can be best seen in FIG. 3. A pair of side-by-side openings 56 and 58 are provided in bracket 54, with opening 56 being disposed in alignment with contact 38, and with opening 58 being disposed in alignment with contact 40. A flange 60 depends from the free end of bracket 54, and flange 60 includes an arcuate segment 62 which borders one side of opening 58. A further arcuate flange segment 64 is provided at a diametrically opposed side of opening 58 from flange segment 62, and both flange segments include an arcuate recess 66 for a purpose to be hereafter be described.

Opening 56 is somewhat smaller than opening 58, as can be best seen in FIG. 4. Arcuate flange segments 68 and 70 are provided at diametrically opposed sides of opening 56, and include an arcuate recess 72 in the lower end thereof similar to the recess 66 and flange segments 62 and 64. Similar types of light bulbs 74 and 76 are associated with openings 58 and 56, respectively, except that light bulb 74 is substantially larger than light bulb 76. Each light bulb includes a cylindrical metallic base 78 having a pair of diametrically opposed pins 80 extending outwardly therefrom. The pins associated with light bulb 74 are adapted to be received within recesses 76 in flange segments 62 and 64, and the pins associated with light bulbs 76 are adapted to be received within recesses 72 in flange segments 68 and 70. The light bulbs each include a metallic contact portion 82 (FIG. 3) at the lower end thereof, which contact portions bear against contact portions 38 and 40 of terminal clips 34 and 36, respectively. When the light bulbs are in place, the flange segments and associated pins retain the contacts at the end of the light bulbs against contact portions 38 and 40 with light spring pressure so as to insure good electrical contact.

With reference to FIG. 4, it will be noted that opening 58 includes enlarged cutout portions 86 at opposite corners thereof, whereas opening 56 also includes enlarged cutout portions 88 at opposite corners thereof. The enlarged cutout portions facilitate ready removal of bulbs 74 and 76, since the bulbs may be merely manually depressed to free the pins 80 thereon from the recesses in the flange segments, and then rotated approximately 90° to bring the pins into alignment with the enlarged cutout portions, whereupon the bulbs may be freed from the mounting plate, and replaced with new bulbs by reversing the process.

I claim:

1. A light fixture comprising: a frame having first and second open sides, a terminal block associated with said frame, first and second side-by-side terminal clips mounted on said frame and having contact portions extending outwardly therefrom, electrical wires extending from said terminal block and connected to said terminal clips; a mounting plate secured to said first open side of said frame, said mounting plate having external dimensions similar to the external dimensions of said first open side so as to effectively close said first open side, a bracket formed from a portion of said mounting plate, unitary therewith and extending outwardly therefrom, first and second side-by-side openings in said bracket, the axes of said openings being parallel to one another and perpendicular to said bracket, each opening being disposed in alignment with one of said clip contact portions, means providing an arcuate flange extending at least partially around each of said openings and adapted to receive therewithin the cylindrical base of a light bulb, said bracket and said flanges being adapted to support said light bulbs with a contact point at the end thereof in electrically conductive engagement with the contact portion of one of said terminal clips; and a lens secured to the second open side of said frame and covering said mounting plate and light bulbs associated therewith.

2. A light fixture as set forth in claim 1 wherein said terminal clips are generally L-shaped members, with one leg secured to said frame and the other leg extending away from the frame and defining said contact portion.

3. A light fixture as set forth in claim 1 wherein said means providing an arcuate flange extending at least partially around each of said openings is provided by diametrically opposed spaced flange segments.

4. A light fixture as set forth in claim 3 wherein each flange segment includes a recess therein adapted to receive and seat therewithin a pin extending outwardly from the cylindrical base of a light bulb.

5. A light fixture as set forth in claim 4 wherein said bracket is a generally planar member extending outwardly from said mounting plate, and said flange segments extend generally perpendicularly with respect to the plane of said bracket.

6. A light fixture as set forth in claim 1 wherein said frame, mounting plate and lens are generally square in external configuration.

* * * * *

UNITED STATES PATENT AND TRADEMARK OFFICE
CERTIFICATE OF CORRECTION

PATENT NO. : 4,157,585
DATED : June 5, 1979
INVENTOR(S) : Jerry H. Freeman

It is certified that error appears in the above-identified patent and that said Letters Patent are hereby corrected as shown below:

In the heading, beneath the inventors name and address, the assignee should be identified as -- Assignee: Unarco Industries, Inc., Chicago, Ill. -- .

*Signed and Sealed this*

*Fourth* Day of *December 1979*

[SEAL]

*Attest:*

SIDNEY A. DIAMOND

*Attesting Officer*     *Commissioner of Patents and Trademarks*